(12) United States Patent
Sayama

(10) Patent No.: US 8,336,955 B2
(45) Date of Patent: Dec. 25, 2012

(54) ERRONEOUS OPERATION PREVENTING DEVICE AND STOWABLE VEHICLE SEAT

(75) Inventor: Tatsuo Sayama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 161 days.

(21) Appl. No.: 12/937,606

(22) PCT Filed: Apr. 16, 2009

(86) PCT No.: PCT/JP2009/057667
§ 371 (c)(1),
(2), (4) Date: Oct. 13, 2010

(87) PCT Pub. No.: WO2009/128509
PCT Pub. Date: Oct. 22, 2009

(65) Prior Publication Data
US 2011/0025112 A1 Feb. 3, 2011

(30) Foreign Application Priority Data
Apr. 16, 2008 (JP) ................. 2008-106707

(51) Int. Cl.
*B60N 2/36* (2006.01)
(52) U.S. Cl. ........................................................ 297/15
(58) Field of Classification Search ..................... 297/15
See application file for complete search history.

(56) References Cited

U.S. PATENT DOCUMENTS

| | | | | |
|---|---|---|---|---|
| 7,377,582 B2 * | 5/2008 | Fukada et al. | ................. | 297/15 |
| 7,717,489 B2 * | 5/2010 | Mitsuhashi | ................. | 297/15 X |
| 7,967,375 B2 * | 6/2011 | Yu et al. | ................. | 297/15 X |
| 8,083,287 B2 * | 12/2011 | Yu et al. | ................. | 297/15 X |
| 8,141,930 B2 * | 3/2012 | Sayama | ................. | 297/15 X |
| 8,146,977 B2 * | 4/2012 | Li et al. | ................. | 297/15 X |
| 8,177,281 B2 * | 5/2012 | Sayama | ................. | 297/15 X |
| 2001/0052718 A1* | 12/2001 | Sugiura et al. | ................. | 297/15 |

FOREIGN PATENT DOCUMENTS

| | | |
|---|---|---|
| JP | 11-222057 A | 8/1999 |
| JP | 2001-347864 A | 12/2001 |
| JP | 2005-225376 A | 8/2005 |
| JP | 2006-082698 A | 3/2006 |

\* cited by examiner

*Primary Examiner* — Rodney B White
(74) *Attorney, Agent, or Firm* — Drinker Biddle & Reath LLP

(57) ABSTRACT

A seat has an erroneous operation preventing device for, locking movement of a seat strap to regulate the stowing or folding operation, the device including a movable member provided on a seat back side to be abutted with the strap, a first connecting member that is connectable to the movable member, a second connecting member connected to the first connecting member through a first connecting portion, a strap connecting member connected to the second connecting member through a second connecting portion and locked to one end portion side of the strap, and a regulator for regulating the movable member or the first connecting member movably toward one side, wherein the first connecting member is supported on a first movable shaft provided on the seat back side, and the first connecting portion is arranged to be moved to cross a straight line connecting the shaft portion and the second connecting portion.

13 Claims, 16 Drawing Sheets

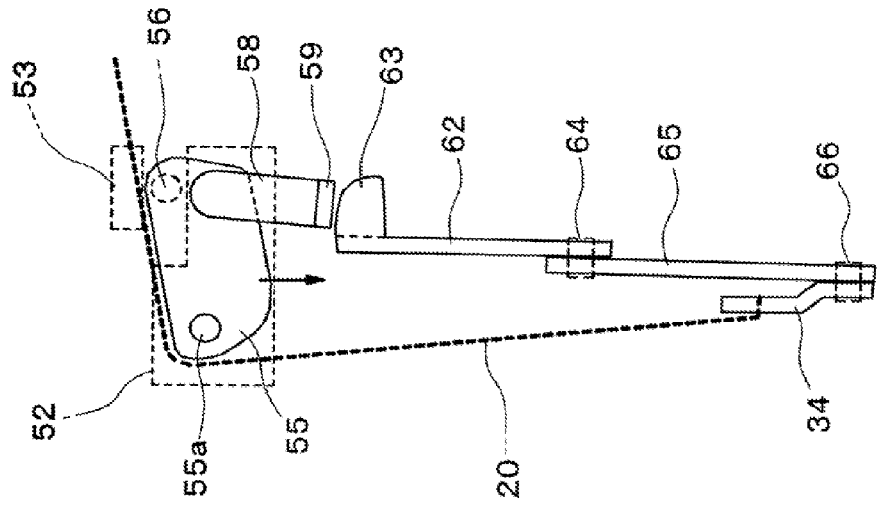
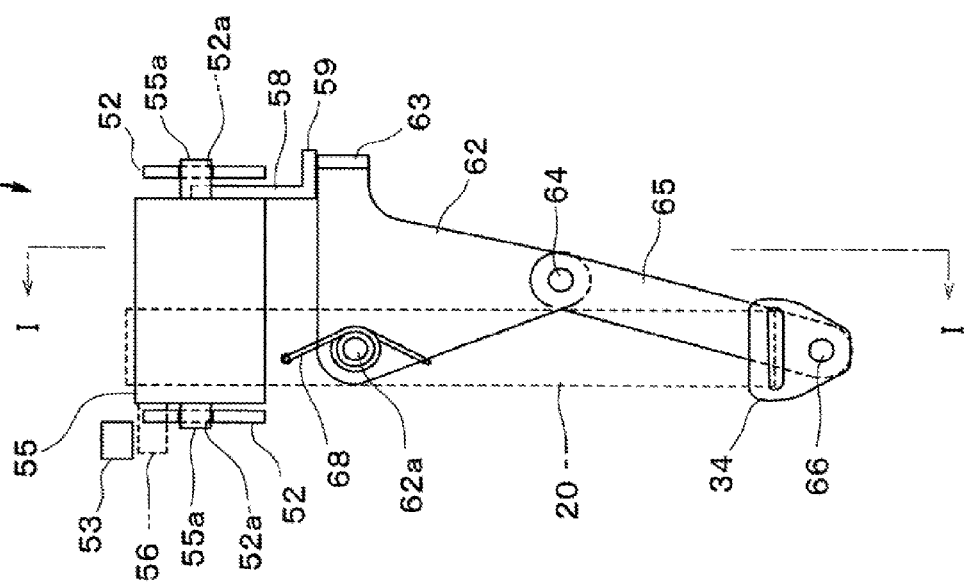

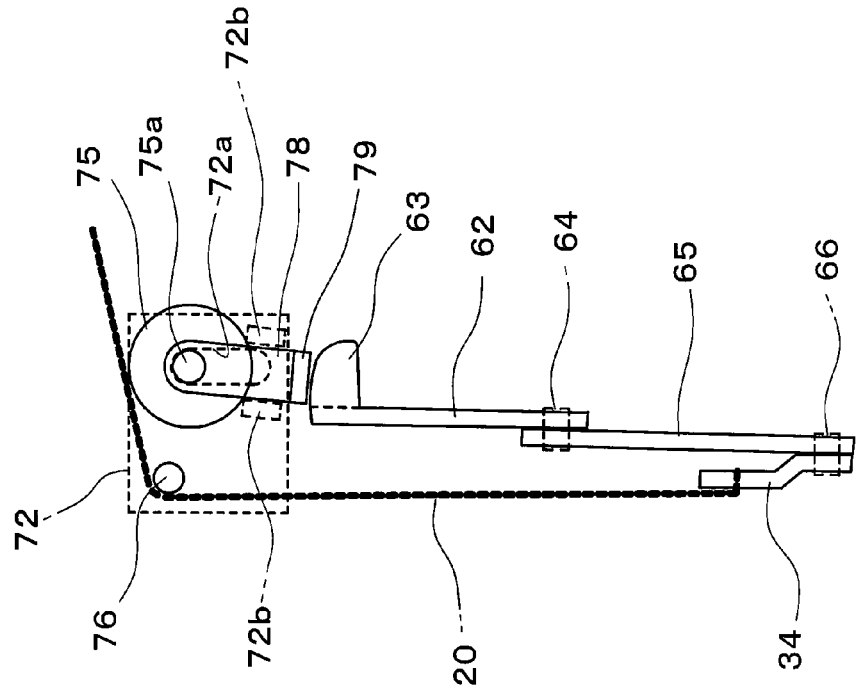
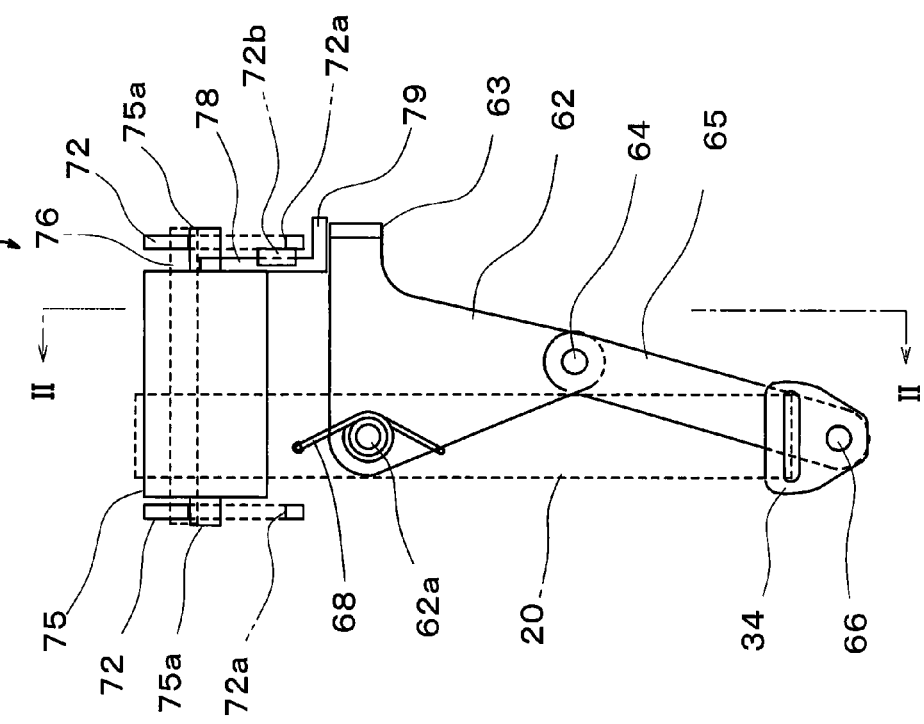

ERRONEOUS OPERATION PREVENTING DEVICE AND STOWABLE VEHICLE SEAT

CROSS REFERENCE TO RELATED APPLICATIONS

This application is the U.S. national phase of the International Patent Application No. PCT/JP2009/057667, filed Apr. 16, 2009, which claims the benefit of Japanese Patent Application No. 2008-106707, filed Apr. 16, 2008, the entire content of which is incorporated herein by reference.

BACKGROUND

The present invention relates to an erroneous operation preventing device and a stowable vehicle seat, particularly to an erroneous operation preventing device and a stowable vehicle seat that reliably performs stowing and restoring operations.

Conventionally, there is a known stowable vehicle seat, for example a known technology for supporting a rear end portion of a seat cushion constituting the vehicle seat rotatably in a front and rear direction on the front side of a storage recess portion (stowage recess portion) formed on a vehicle body floor, and, in a state in which a seat back is folded down with respect to the seat cushion, rotating the vehicle seat rearward to stow the vehicle seat in the storage recess portion.

That is, as shown in Japanese Unexamined Patent Application Publication No. 2006-082698 ("the '698 Publication"), rotating shafts provided on both left and right side edges in a front part of the storage recess portion, and brackets provided in left and right parts in a rear end portion of the seat cushion are provided, and the left and right brackets are arranged to support the rotating shafts. Therefore, the rear end portion of the seat cushion is supported rotatably in the front and rear direction, so that the seat is storable in the storage recess portion.

In the technology of the '698 Publication, operating element of a reclining mechanism (reclining lock) and a leg portion locking release mechanism (striker lock) operated during storing (stowing) and restoring of the stowable vehicle seat are divided according to functions. That is, an extension strap (strap) and a lever are respectively used as the operating element of the reclining mechanism and the leg portion locking release mechanism. These operating elements are installed on the back surface side of the seat to which a passenger's hand does not reach in a seated state for preventing an erroneous operation by children or the like.

A locking release operation for the reclining mechanism by this strap is performed by pulling the strap rearward of the seat by an operator from the side of a cargo compartment. In general, since the strap is attached to the back surface side of the seat as described above, there is no concern about the erroneous operation.

However, the mechanism is that a lock of the reclining mechanism is also released by pulling the strap upward of the seat back. Therefore, in a case where the strap is pulled upward for some reasons, there is a fear that the lock of the reclining mechanism is released, so that the seat back is moved unpredictably to a passenger.

Further, in a seat in which an operating element respectively provided in a reclining locking release mechanism and a leg portion locking release mechanism are integrated into one operating element, a strap may also be used as the operating element. Therefore, there is the same problem as the above technology.

SUMMARY

In consideration with the above problems, an object of various embodiments of the present invention is to provide a stowable vehicle seat having an erroneous operation preventing device that reliably performs stowing and restoring operations.

Another object of the present invention is to provide a stowable vehicle seat having an erroneous operation preventing device for reducing cost and weight, and working effectively even during arranging the seat other than the stowing and restoring operations.

The above problems are solved by an erroneous operation preventing device for, during stowing or folding operation of a stowable vehicle seat that is rotated rearward and stowed by operating an operating element, locking movement of the operating element to regulate the stowing or folding operation, comprising a connecting mechanism, including a movable member to be abutted with the operating element to be moved, a first connecting member connectable to the movable member, a third connecting member locked to one end portion side of the operating element, a second connecting member for connecting the first connecting member and the third connecting member, and a regulator for regulating the movable member or the first connecting member movably only toward one side, wherein the first connecting member is movably supported through a first movable shaft, the first connecting member and the second connecting member are movably connected to each other through a first connecting portion, the second connecting member and the third connecting member are movably connected to each other through a second connecting portion, and the first connecting portion is arranged to be moved to cross a straight line connecting the first movable shaft and the second connecting portion.

With the above configuration, only in a case where the operating element is pulled rearward of a seat back, the movable member is pushed by the operating element and moved to move the first connecting member, and hence the first connecting portion is moved to cross the straight line connecting the first movable shaft and the second connecting portion. Therefore, the second connecting portion connected to the operating element through the third connecting member is operable in the pulling direction of the operating element. In a case where the operating element is pulled upward, the movable member is not moved, so that the first connecting portion is not moved to cross the straight line connecting the first movable shaft and the second connecting portion. Therefore, the first connecting member is unmovable due to the regulator, and the second connecting portion connected to the operating element is unmovable in the pulling direction of the operating element, so that an operation cannot be performed in the pulling direction of the operating element. That is, in a case where a strap is pulled in the particular direction such as upward or downward due to an improper or unintentional operation or the like, operation force is not transmitted to a link mechanism, so that an unpredictable movement of the seat is preventable and reliable operability is ensured. Further, the pulling direction of the strap in which this erroneous operation preventing device is actuated is the direction relative to the seat back. Therefore, even when the seat is arranged at a stowage and restoration position or the like, the erroneous operation preventing device is similarly actuated, so that more reliable operability is ensured.

The regulator preferably comprises a first regulating member provided on one side of the movable member or the first connecting member, and a second regulating member provided on the side of a seat back, the second regulating member being abuttable with the first regulating member.

With the above configuration, when the movable member or the first connecting member is moved toward the other side, the first regulating member is abutted with the second regulating member, so that the movement is regulated. Therefore, in a state in which the first connecting portion is not moved to a position to cross the straight line connecting the first movable shaft and the second connecting portion, the state being generated in a case where the operating element is operated upward or the like, the first connecting member is abutted with the movable member whose movement is regulated, or the first regulating member provided in the first connecting member is abutted with the second regulating member, so that the movement is regulated. Consequently, the operation in the pulling direction of the operating element is locked. In a case where the movable member or the first connecting member is moved toward the one side, the first regulating member is not abutted with the second regulating member and remains movable. Therefore, when the first connecting portion is moved to cross the straight line connecting the first movable shaft and the second connecting portion by normally operating the operating element, the first connecting member is movable and permitting the operation in the pulling direction of the operating element. Consequently, the unpredictable movement of the seat is preventable and more reliable operability is ensured.

Further, the first connecting member may be urged in a direction where the first regulating member is abutted with the second regulating member all the time. Therefore, in a state in which the operating element is not operated, the first regulating member provided in the movable member or the first connecting member is abutted with the second regulating member, so that the movement of the movable member or the first connecting member is regulated. Consequently, abnormal noise and backlash are prevented at low cost.

Further, the first connecting member and the second connecting member may be arranged movably in the direction crossing the moving direction of the movable member. Therefore, the erroneous operation preventing device for saving a space and reducing weight and cost is formed.

Further, the movable member may have a fourth connecting member that is slidably contactable with the operating element, and a fifth connecting member that is connectable to the first connecting member, the fifth connecting member is connected to the fourth connecting member, and the fifth connecting member is supported at a position distant from a movable shaft of the fourth connecting member. Therefore, the fifth connecting member is reliably movable in accordance with movement of the fourth connecting member, resulting in an erroneous operation preventing device that saves space, reduces the weight and the cost, and reliably performs a locking operation or a release operation.

Further, the fifth connecting member may be supported coaxially to a movable shaft of the fourth connecting member, resulting in an erroneous operation preventing device that saves space, reduces the weight and the cost, and reliably performs the locking operation or the release operation.

The above problems may also be solved by a stowable vehicle seat, having an erroneous operation preventing device for, during stowing or folding operation of a stowable vehicle seat that is rotatable rearward and stowable by operating an operating element, locking movement of the operating element to regulate the stowing or folding operation, the erroneous operation preventing device including a connecting mechanism, including a movable member to be abutted with the operating element to be moved, a first connecting member that is connectable to the movable member, a third connecting member locked to one end portion side of the operating element, a second connecting member for connecting the first connecting member and the third connecting member, and a regulator for regulating the movable member or the first connecting member movably only toward one side, wherein the first connecting member is movably supported through a first movable shaft, the first connecting member and the second connecting member are movably connected to each other through a first connecting portion, the second connecting member and the third connecting member are movably connected to each other through a second connecting portion, and the first connecting portion is arranged to be moved to cross a straight line connecting the first movable shaft and the second connecting portion.

With the above configuration, the stowable vehicle seat provided with the erroneous operation preventing device having the above-described operations is obtained.

With the erroneous operation preventing device described above, only in a case where the operating element is pulled rearward of the seat back, the operation in the pulling direction of the operating element is performable. Therefore, it is possible to provide the erroneous operation preventing device in which in a case where the operating element is pulled in the particular direction such as upward or downward due to the improper or unintentional operation or the like, the operation force is not transmitted to the link mechanism, so that the unpredictable movement of the seat is preventable and more reliable operability is ensured.

With the erroneous operation preventing device described above, only in a case where the operating element is pulled rearward of the seat back, the first regulating member provided in the movable member or the first connecting member is not abutted with the second regulating member and remains movable. Therefore, it is possible to provide the erroneous operation preventing device in which a pulling operation of the operating element is performable, the unpredictable movement of the seat is preventable, and more reliable operability is ensured.

With the erroneous operation preventing device described above, in a state in which the operating element is not operated, the first regulating member provided in the movable member or the first connecting member is abutted with the second regulating member, so that the movement of the movable member or the first connecting member is regulated. Consequently, it is possible to provide the erroneous operation preventing device in which the abnormal noise and the backlash are suppressed at low cost.

With the erroneous operation preventing device described above, it is possible to form the erroneous operation preventing device for saving the space and reducing the weight and the cost.

With the erroneous operation preventing device described above, the fifth connecting member is reliably movable in accordance with the movement of the fourth connecting member. Therefore, it is possible to provide the erroneous operation preventing device that reliably performs the locking operation or the release operation.

With the stowable vehicle seat described above, it is possible to provide the stowable vehicle seat provided with the erroneous operation preventing device having the operations described above.

BRIEF DESCRIPTION OF THE DRAWINGS

The following drawings and description below illustrate various exemplary embodiments of the invention.

FIGS. 12A and B are respective schematic illustrative front and sectional views of an erroneous operation preventing device according to the first embodiment of the present invention;

FIGS. 16A and B are respective schematic illustrative front and sectional views of an erroneous operation preventing device according to a second embodiment of the present invention.

DETAILED DESCRIPTION

Hereinafter, embodiments of the present invention will be described with reference to the drawings. It should be noted that members, arrangement, and the like described below do not limit the present invention but, as a matter of course, can be variously modified along the gist of the present invention.

First Embodiment

FIGS. 1 to 15 show a first embodiment of the present invention. The configuration of a seat S will be described based on FIGS. 1 to 11C, and the first embodiment of the erroneous operation preventing device according to the present invention will be described mainly based on FIGS. 12A to 15C.

Firstly, a configuration of a seat S according to the present embodiment will be described based on FIGS. 1 to 4.

A vehicle equipped with the seat S according to the present embodiment is provided with three-row of seat arranged in line in the front and rear direction, and the seat on the third row is stowable. The seat S according to the present embodiment relates to the seat on the third row. On the rear side of the seat S, a stowage recess portion 5 serving as a stowage area for stowing the seat S is provided on a vehicle body floor 4. A floor carpet (not shown) is laid over the substantially entire surface on the vehicle body floor 4.

Figure 1:
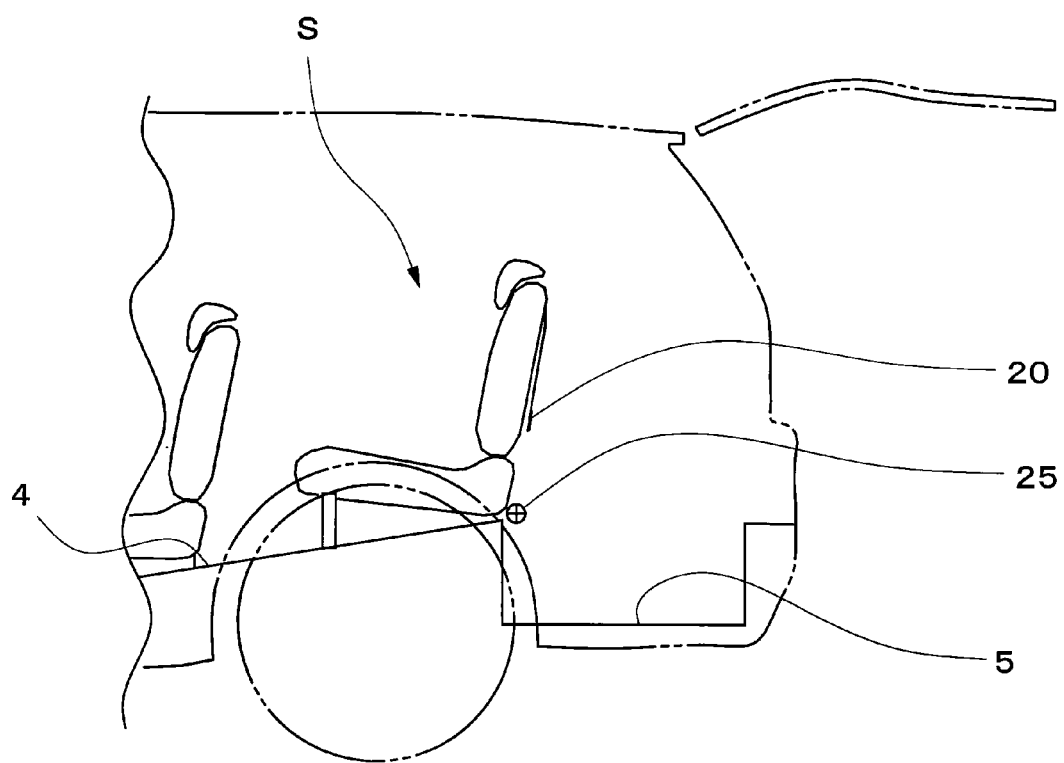
FIG. 1 is a schematic side view of a rear part of a vehicle equipped with a stowable vehicle seat according to embodiments of the present invention.
Figure 2:
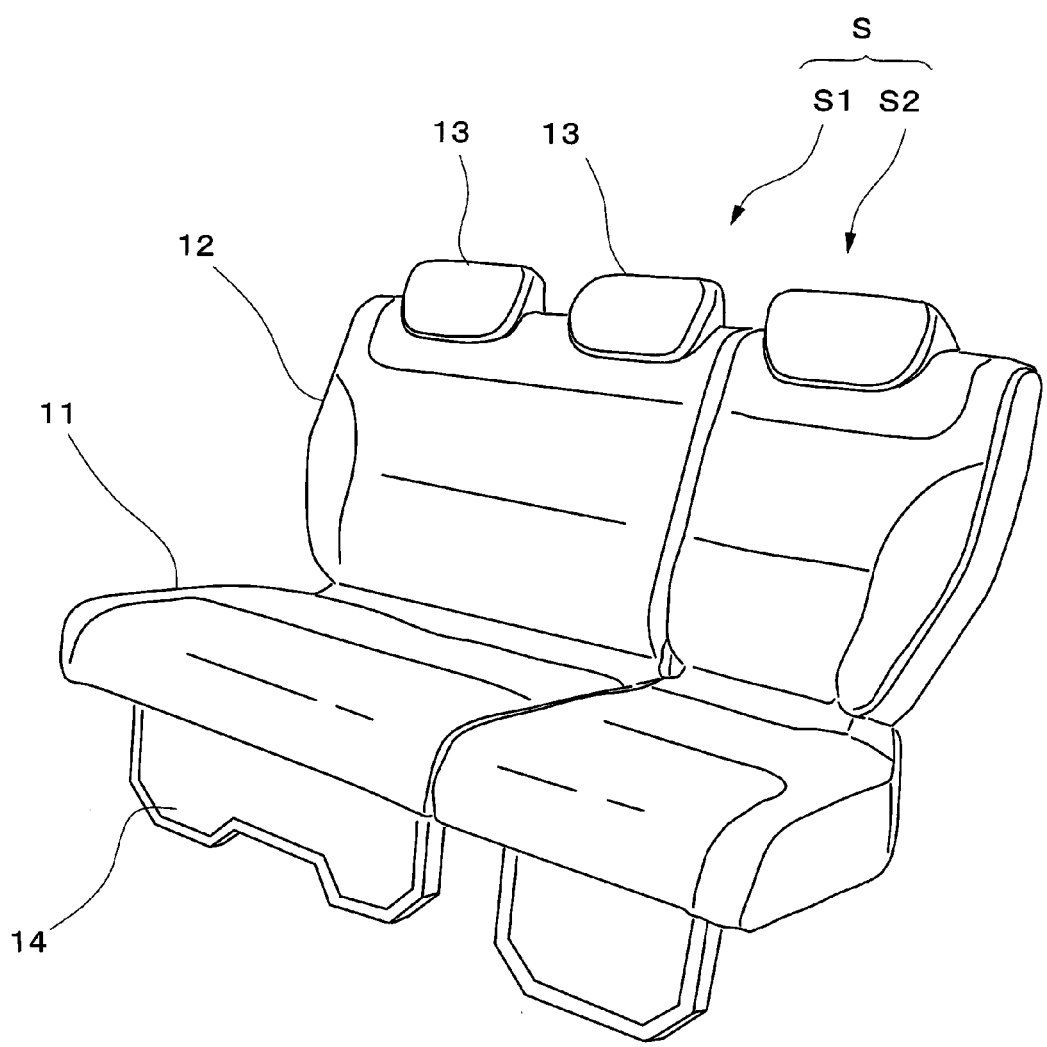
FIG. 2 is a front-side perspective view of a stowable vehicle seat according to a first embodiment of the present invention.

FIG. 2 schematically shows the seat S according to the present embodiment. The seat S has seating spaces for three people arranged in the left and right direction. The seat S includes a right-side seat S1 for two people positioned on the right side relative to the running direction of the vehicle, and a left-side seat S2 for one person.

The "right and left side" indicating the direction in the following description is relative to the running direction of the vehicle.

Storage mechanisms and operation methods of the right seat S1 and the left seat S2 are the same as each other. Therefore, in the following description, arbitrary one of the seats will be taken as the seat S and description will be given to the seat S.

Figure 3:
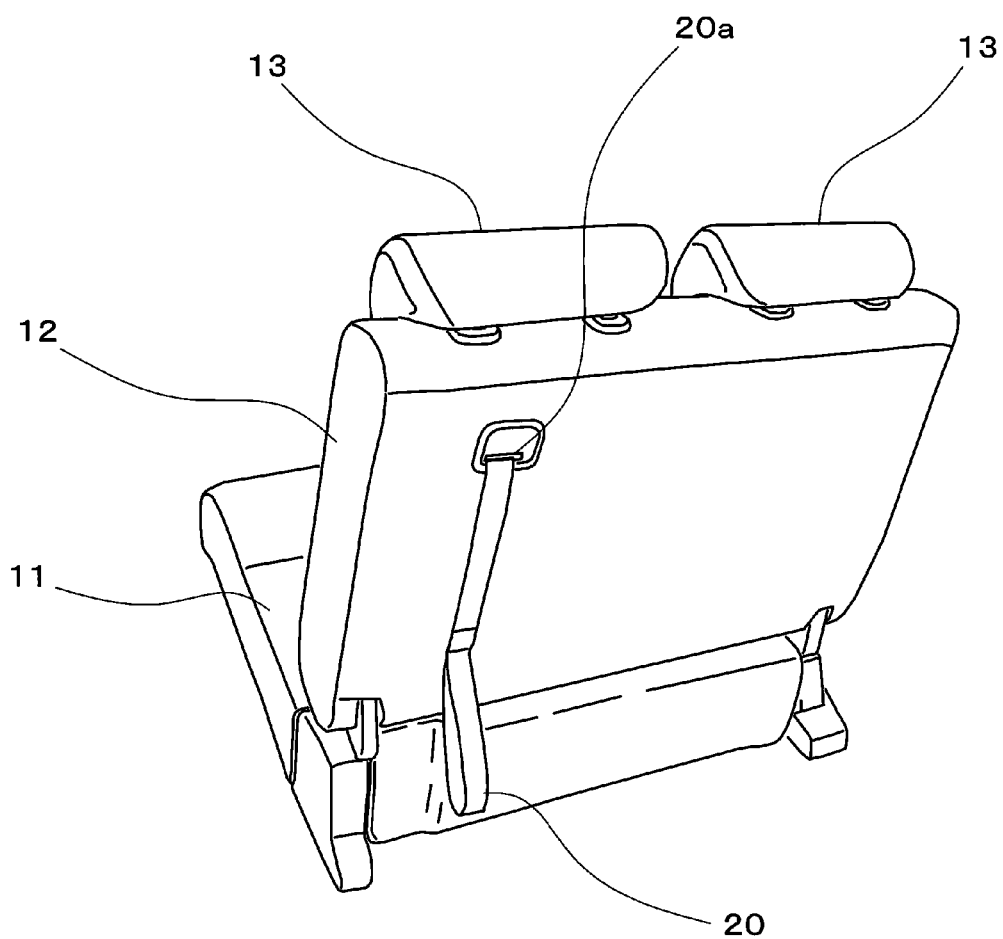
FIG. 3 is a rear-side perspective view of the stowable vehicle seat according to the first embodiment of the present invention.

The seat S includes a seat cushion 11, a seat back 12, headrests 13, 13, and a front-side leg portion 14. As shown in FIG. 3, from the back side of the seat back 12, a strap 20 for performing a stowing and restoring operation of the seat S is extended outward from a strap outlet portion 20a.

In the seat S according to the present embodiment, the operating element of a reclining mechanism 27 and a leg portion locking release mechanism operated during stowing and restoring the stowable vehicle seat are integrated into one as the strap 20.

The strap 20 serves as an operating element operated during the stowing and restoring operation of the seat S, and is formed by a wide bendable belt having a length of approximately 1 m so that a passenger can easily operate the strap. Since the stowing and restoring operations of the seat S is performable by a pulling operation of the strap 20, an operation load is reduced in comparison to an operation using a lever. In a state in which the stowing and restoring operations of the seat are not performed, a part of the strap 20 is hooked on a back surface of the seat back 12 by a planer fastener.

Figure 4:
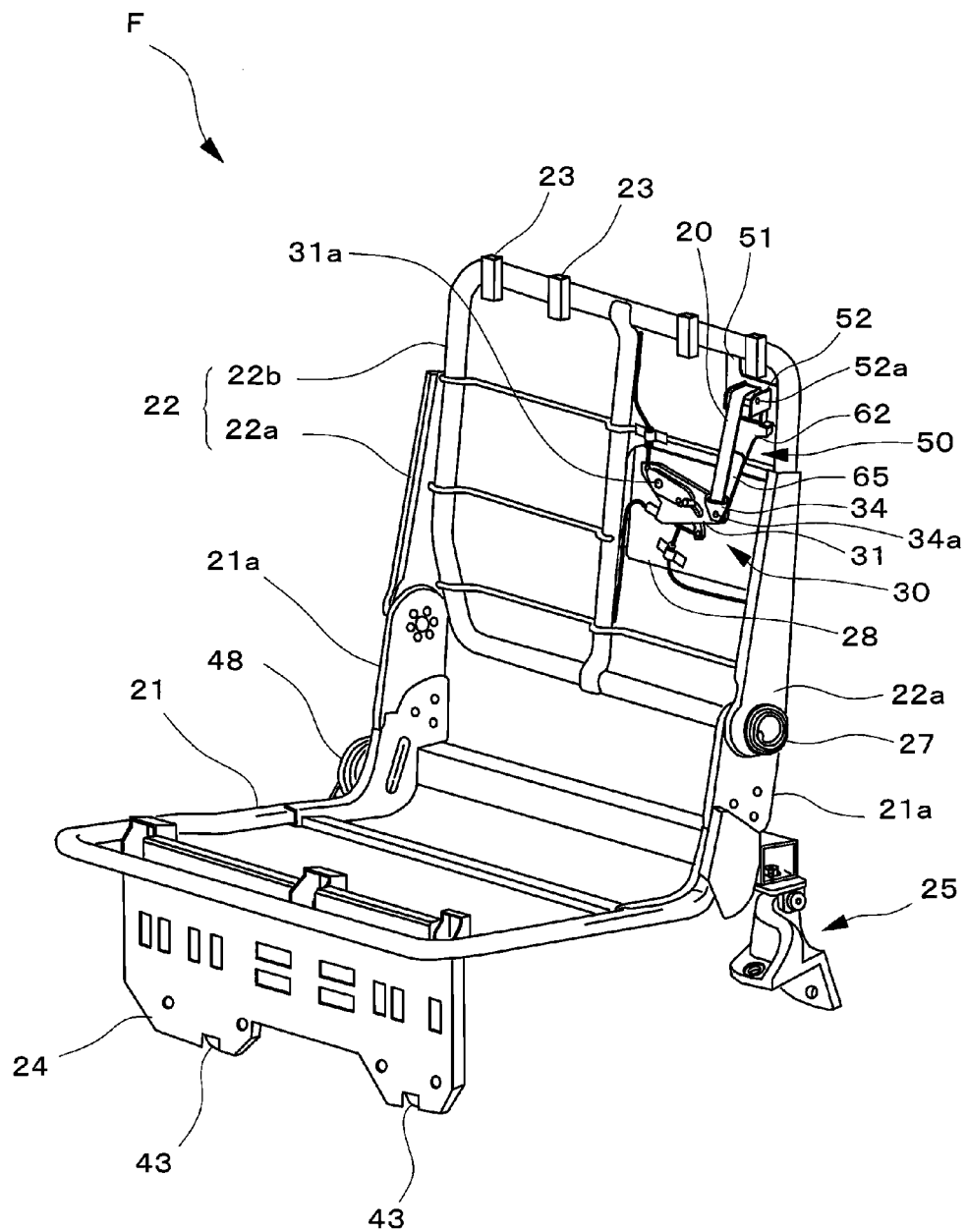
FIG. 4 is a schematic perspective view of a seat frame according to the first embodiment of the present invention.

A seat frame F of the seat S shown in FIG. 4 includes a seat cushion frame 21 constituting the seat cushion 11, a seat back frame 22 constituting the seat back 12, and a front-side leg portion frame 24. Pillars (not shown) of a headrest frame (not shown) are arranged in an upper part of the seat back frame 22 through pillar support portions 23, 23.

The front-side leg portion frame 24 is covered by a cover material (not shown) to constitute the front-side leg portion 14. An upper part of the front-side leg portion frame 24 is supported on a front side of the seat cushion frame 21 rotatably in the front and rear direction. Locking claws 43, 43 provided on the vehicle body floor 4 side and detachably connected to a leg portion striker 44 are arranged at two points in a lower part of the front-side leg portion frame 24.

The seat cushion frame 21 is covered by a cushion pad, a cover, or the like (not shown) to constitute the seat cushion 11 for supporting the passenger from below. The front side of the seat cushion frame 21 is supported detachably by the front-side leg portion frame 24 on the vehicle body floor 4 side, and a rear end portion side of the seat cushion frame is supported by seat support portions 25, 25 rotatably in the front and rear direction. A coil spring 48 is attached to each of the seat support portion 25 and urges the seat cushion 11 in the forward rotating direction to ease an impact during stowage all the time.

Back frame support portions 21a, 21a connectable to the seat back frame 22 are arranged at the rear end portion of the seat cushion frame 21.

The seat back frame 22 is covered by a cushion pad or the like (not shown) to constitute the seat back 12 for supporting a back of the passenger from the rear side. In the present embodiment, the seat back frame is formed into a substantially rectangular frame body. In more detail, the seat back frame 22 includes two side frames 22a, 22a spaced from each other in the left and right direction extending in the vertical direction, and a center frame 22b serving as a substantially rectangular frame body sandwiched by the side frames 22a, 22a.

Lower portion sides of the side frames 22a, 22a are connected to the back frame support portions 21a, 21a through the reclining mechanism 27.

A substantially plate shape back plate 28 is arranged on the inner side of the center frame 22b serving as the frame body along a surface for supporting the back of the passenger. A link mechanism 30 described below is provided in the back plate 28. An erroneous operation preventing device 50 described below is provided in the center frame 22b and the back plate 28.

Next, a configuration of the link mechanism 30, the stowing and restoring operations of the seat S, and an action of the link mechanism 30 will be described based on FIGS. 5 to 11.

Figure 5:
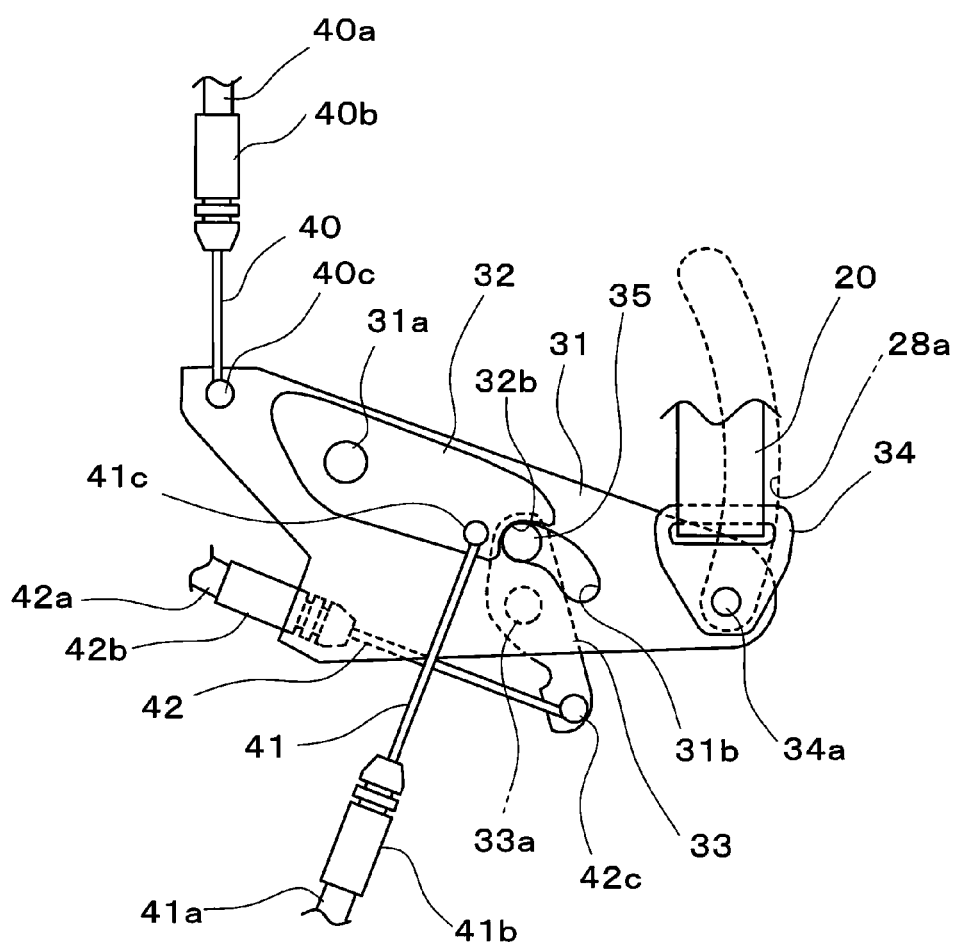
FIG. 5 is an enlarged illustrative side view of a link mechanism according to the first embodiment of the present invention.

Firstly, the configuration of the link mechanism 30 will be described based on FIGS. 5 to 7.

The link mechanism 30 is connected to the strap 20 operated during stowing and restoring the seat S, provided with a function of appropriately releasing rotation of the reclining mechanism 27 and a locked state between the front-side leg portion 14 and the vehicle body floor 4 in connection with the operation of the strap 20 and a state of the seat S, and formed on the back plate 28 as described above.

The link mechanism 30 has a first link member 31, a second link member 32, and a third link member 33 supported rotatably. Power transmission members are respectively connected to each of the link members. In accordance with a state between the power transmission members and an action between the link members, the link members are actuated in connection with each other.

The power transmission members include a reclining release wire 40 connected to the reclining mechanism 27, a leg portion release wire 41 connected to the locking claws 43, 43 of the front-side leg portion 14 (front-side leg portion frame 24), a cancel wire 42 for detecting a folded-down state (folded state) of the seat back 12, and the strap 20.

The first link member 31 is a substantially inverted triangular member, which is flat in the left and right direction, and the reclining release wire 40 as a power transmission member and the strap 20 through a strap connecting member 34 are locked at each of locking portions 34a, 40c arranged in both sides. The first link member 31 is rotatably supported on the back plate 28 by a first shaft portion 31a provided between the locking portions 40c, 34a.

Between the first shaft portion 31a and the locking portion 34a, an arc-shaped long hole 31b is formed to draw a part of a concentric circle around a second shaft portion 33a described below.

The other end portion side of the reclining release wire 40 and the strap 20 locked to the first link member 31 will be described below.

Figure 7:
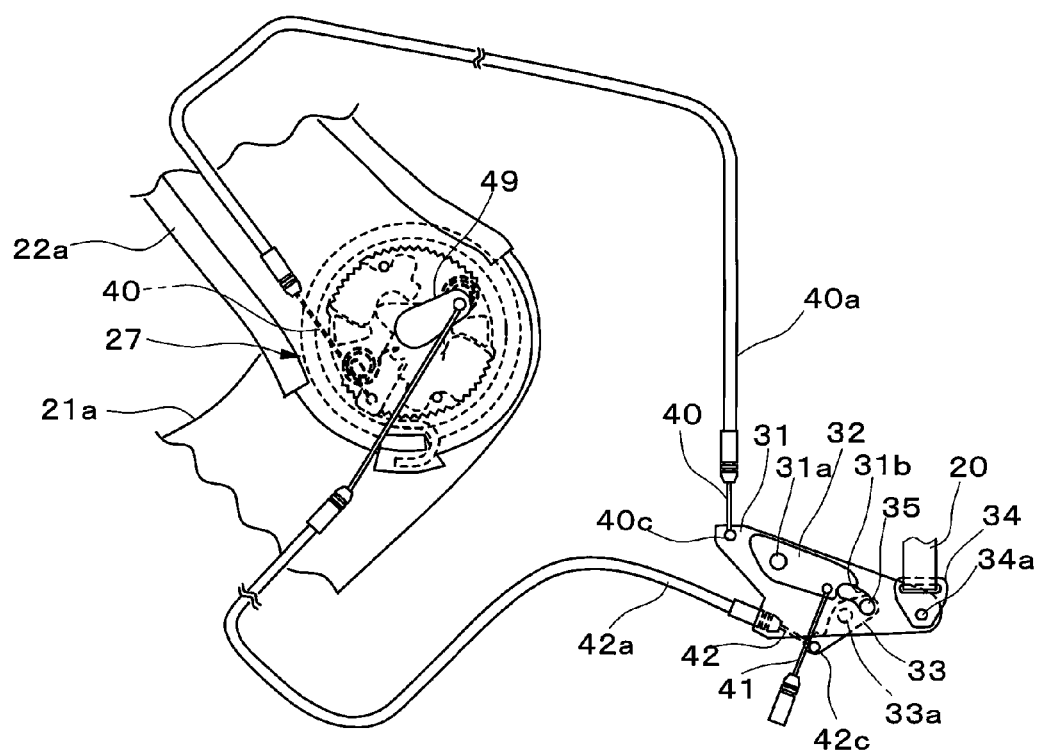
FIG. 7 is an illustrative side view of the link mechanism during pulling down of a seat back according to the first embodiment of the present invention.

As shown in FIG. 7, the other end portion side of the reclining release wire 40 locked to the locking portion 40c of the end portion side of the first link member 31 is guided by a reclining release cable 40a, and connected to the reclining mechanism 27 serving as a reclining assembly for performing a detaching and locking operation of a reclining of the seat back 12.

In the reclining mechanism 27, when the reclining release wire 40 is pulled toward the link mechanism 30 side by an action of the link mechanism 30, a locked state of the reclining mechanism 27 is released to adjust the reclining of the seat back 12.

The other end portion side of the strap 20 connected to the first link member 31 through the strap connecting member 34 is extended outward of the seat back 12 from the strap outlet portion 20a provided on the back surface of the seat back 12 so that the passenger can easily operate the strap. In connection with the operation of the strap 20 by the passenger, power (operation force of the passenger) is transmitted to the first link member 31.

That is, when the strap 20 is pulled, the first link member 31 is rotated and the lock of the reclining mechanism 27 is released.

The second link member 32 is a substantially rectangular member arranged on the first link member 31. One end portion side of the second link member is supported rotatably and coaxially with the first link member 31 by the first shaft portion 31a, and a locking recess portion 32b that is abuttable with a locking projection 35 described below is formed on the other end portion side. A locking portion 41c locked to the leg portion release wire 41 is formed between the first shaft portion 31a and the locking recess portion 32b.

The other end portion side of the leg portion release wire 41 locked to the second link member 32 will be described below.

Figure 6:
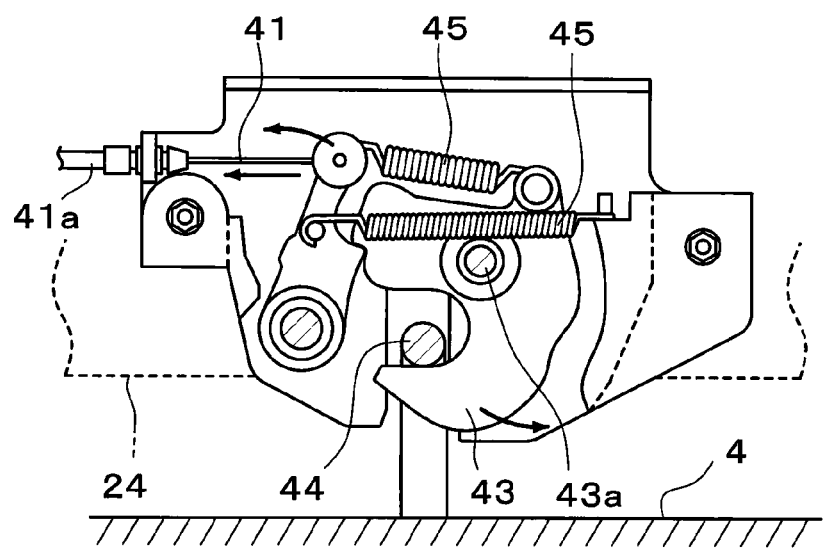
FIG. 6 is a schematic illustrative side view of a locking portion of a front-side leg portion according to the first embodiment of the present invention.

As shown in FIG. 6, the other end portion side of the leg portion release wire 41 locked to the locking portion 41c of the second link member 32 is guided by a leg portion release cable 41a, and connected to the leg portion locking release mechanism. The leg portion locking release mechanism is formed within the front-side leg portion 14. When the leg portion release wire 41 is pulled toward the link mechanism 30 side by the action of the link mechanism 30, the locking claw 43 connected to the leg portion release wire 41 is rotated around a rotating shaft 43a, and a lock between the locking claw and the leg portion striker 44 on the vehicle body floor 4 side is released, so that the seat cushion 11 is rotatable in the front and rear direction.

The rotation of the locking claw 43 is urged in a direction where the locked state between the locking claw and the leg portion striker 44 is maintained by an urging spring 45 all the time.

The third link member 33 is a substantially rectangular member arranged between the first link member 31 and the back plate 28, and a center part of the third link member is supported rotatably toward the first link member 31 side by the second shaft portion 33a.

The cancel wire 42 is locked at the lower end portion side of this third link member 33 through a locking portion 42c.

The locking projection 35 serving as a cylindrical locking portion is formed at the upper end portion side of the third link member 33. This locking projection 35 is inserted into the arc-shaped long hole 31b formed in the first link member 31, and abutted with and locked to the locking recess portion 32b of the second link member 32 so that the second link member 32 is rotated together with the first link member 31. The locking projection 35 has an outer diameter which is slightly smaller than a width of the long hole 31b. The long hole 31b is formed into an arcuate shape to draw a part of a concentric circle of the second shaft portion 33a as described above. Therefore, together with the rotation of the third link member 33, the locking projection 35 is moved along the long hole 31b. Upper and lower limits in a rotation amount of the third link member 33 are adjusted by the length of this long hole 31b.

The other end portion side of the cancel wire 42 locked to the third link member 33 will be described below.

As shown in FIG. 7, the other end portion side of the cancel wire 42 locked to the locking portion 42c of the third link member 33 is guided by a cancel cable 42a, and connected to a locking rib 49 formed on a connecting portion between the side frame 22a and the back frame support portion 21a. The locking rib 49 is a member provided on the reclining mechanism 27 and attached to rotate together with the side frame 22a. That is, in the present embodiment, the other end portion side of the cancel wire 42 is locked to the locking rib 49, and in a state in which the seat back 12 is folded down, this locking rib 49 pulls the locking portion 42c formed on the third link member 33 through the cancel wire 42.

Although the locking rib 49 locked to the other end portion side of the cancel wire 42 is formed in the reclining mechanism 27 in the present embodiment, the locking rib may be formed at other lock positions as long as it is configured such that the cancel wire 42 is in a state in which the seat back 12 is folded down with respect to the seat cushion 11. Further, the locking rib may be formed at a position distant from the reclining mechanism 27.

In a state in which this third link mechanism 33 is not rotated, the second link member 32 is locked to the first link member 31 by the locking projection 35 and rotated in accordance with the rotation of the first link member 31, and pulls the leg portion release wire 41.

When the third link member 33 is rotated, the locking projection 35 fixed to the third link member 33 is moved along the long hole 31b. Due to the movement of the locking projection 35, the locking recess portion 32b is not abutted with the locking projection 35. Therefore, a locked state between the first link member 31 and the second link member 32 is released.

At this time, even when the first link member 31 is rotated by the operation of the strap 20, the second link member 32 is not rotated. The leg portion release wire 41 locked to the second link member 32 is not pulled even when the first link member 31 is rotated.

That is, in a state in which the seat back 12 is folded down, the lock between the front-side leg portion 14 and the vehicle body floor 4 is not released even when the strap 20 is pulled.

Urging springs (not shown) for urging the reclining release wire 40 and the leg portion release wire 41 all the time in a direction where the locked state is maintained are respectively provided in the reclining release wire 40 on the other end portion side of the link mechanism 30 and the leg portion release wire 41. Thus, in a state in which the passenger does not operate the strap 20, the rotation of the link mechanism 30 is also urged in a direction where the strap 20 is pulled downward all the time through the strap connecting member 34 regarding the first link member 31 and the second link member 32.

Further, an urging spring (not shown) for urging the third link member all the time in the opposite direction to the direction where the third link member is pulled by the cancel wire 42 is attached to the third link member 33. In this case, one end portion side of the urging spring is locked to the lower end portion side of the third link member 33, and the other end portion side is locked to a lower side of the locking portion 34a of the first link member 31. Since the urging spring is attached to the third link member 33, the action of the third link member 33 is made more reliable.

Similarly and preferably, urging springs (not shown) for respectively urging the first and second link members in the directions in which the first and second link members are restored to the original positions (refer to FIG. 9A) are also attached to the first link member 31 and the second link member 32, to assist the rotation of the respective link members 31, 32. In this case, the urging springs with both end portions fixed between the first and second link members and the back plate 28 side are respectively attached to the first link member 31 and the second link member 32. In a case of the second link member 32, the urging spring may be attached between the second link member and the first link member 31. Since the urging springs are also attached to the first link member 31 and the second link member 32, the action is made more reliable.

The locking portion 34a of the strap connecting member 34 provided on the first link member 31 rotatably supports the strap connecting member 34 on the first link member 31, and the other end side of the locking portion is inserted through a guiding hole portion 28a formed in the back plate 28. The guiding hole portion 28a is formed in an arcuate shape to draw a part of a concentric circle to the first shaft portion 31a. Therefore, the locking portion 34a can move within the guiding hole portion 28a in accordance with rotation of the first link member 31. Upper and lower limits in a rotation amount of the first link member 31 are settable by adjusting the length of the guiding hole portion 28a. The strap connecting member 34 is also connected to a second connecting member 65 of the erroneous operation preventing device 50 described below.

Regarding the second link member 32, a convex stopper (not shown) is provided on the back plate 28 or the first link member 31, so that upper and lower limits in the rotation amount are arbitrarily set.

End portion members 40b, 41b serving as end portions on the link mechanism 30 side of the reclining release cable 40a and the leg portion release cable 41a for respectively guiding the reclining release wire 40 and the leg portion release wire 41 are fixed to the back plate 28 by locking members (not shown).

An end portion member 42b serving as an end portion on the link mechanism 30 side of the cancel cable 42a for guiding the cancel wire 42 is fixed to the first link member 31 by a locking member (not shown).

Next, the stowing and restoring operations of the seat S according to the present embodiment and the action of the link mechanism 30 will be described based on FIGS. 8A to 11C.

Firstly, in accordance with FIGS. 8A to 8F, the stowing operation of the seat S will be described.

Figure 8A:
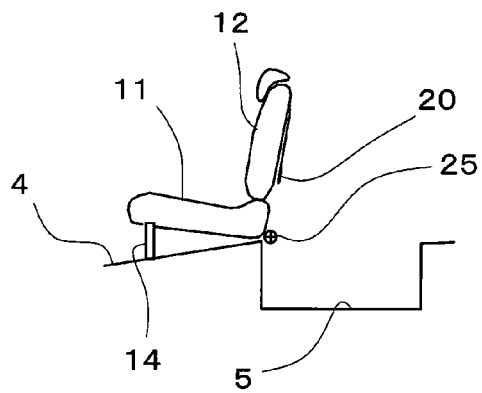
FIGS. 8A-F are illustrative side views showing the operation procedure during a stowing operation of the stowable vehicle seat according to the first embodiment of the present invention.

FIG. 8A shows an installed state of the seat S. The strap 20 is extended from the back surface side of the seat back 12.

Figure 8B:
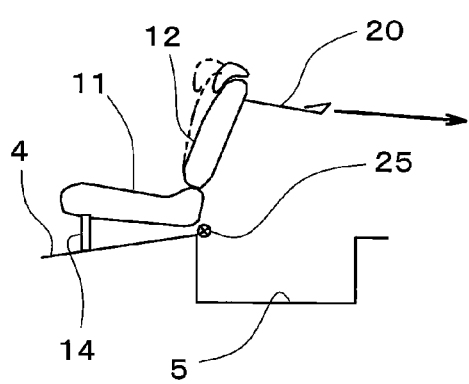

FIG. 8B shows a state in which the lock of the reclining mechanism 27 is released. When the strap 20 is pulled rearward by the passenger, the lock of the reclining mechanism 27 is released.

At this time, the seat back 12 to which the strap 20 is attached is urged forward by the urging spring attached to the reclining mechanism 27. When the strap 20 is pulled against the urging direction, the lock of the locking claws 43, 43 of the front-side leg portion 14 is released by a stress lower than a stress to lay the seat back 12 down rearward. Therefore, the lock of the locking claws 43, 43 is released.

Figure 8C:
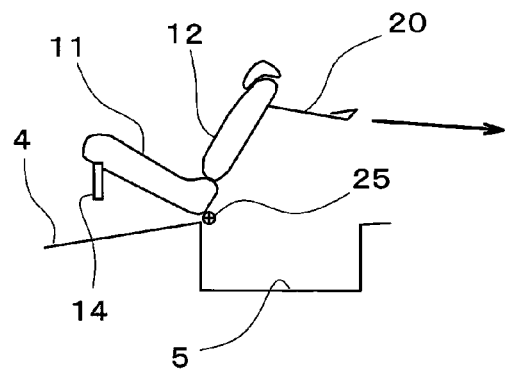

FIG. 8C shows a state in which the lock of the locking claws 43, 43 of the front-side leg portion 14 is released. That is, the lock of the locking claws 43, 43 of the front-side leg portion 14 is released, so that the seat S is made rotatable rearward.

Figure 8D:
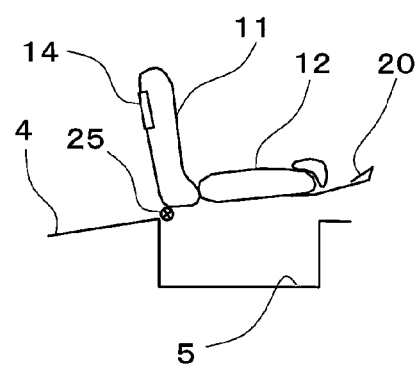
Figure 8E:
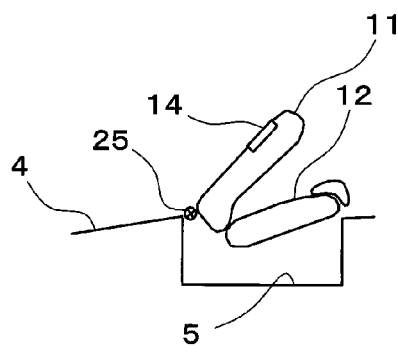

FIGS. 8D and 8E show a state in which the rearward rotation of the seat S is advanced. Since the strap 20 is pulled further, the center of the gravity of the seat S goes beyond a middle point, and after that, the seat is rotated rearward by its own weight and reaches the stowed state. At this time, a rearward rotating speed of the seat S is reduced by the urging spring 48 (coil spring) attached to the seat support portion 25, so that the impact due to the stowage into the stowage recess portion 5 is alleviated. The front-side leg portion 14 is also folded by its own weight. At this time, the seat back 12 is also folded by the urging spring attached to the reclining mechanism 27 and folded down with respect to the seat cushion 11.

Figure 8F:
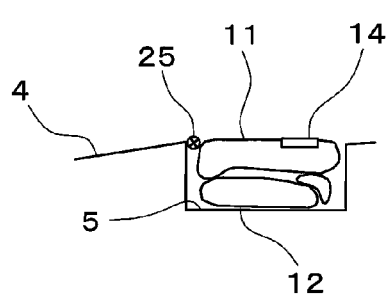

FIG. 8F shows the stowed state of the seat S, and an opening part of the stowage recess portion 5 is formed into a flat surface which is integral with a back surface of the seat cushion 11, so that a large cargo compartment is ensured.

That is, when the passenger only pulls the strap 20 rearward, the seat S in the installed state is stowed.

In order to suppress unstableness of the stowed seat S during running the vehicle, a locking mechanism for detachably locking the back surface of the seat back 12 and a bottom part of the stowage recess portion 5 may be provided.

The action of the link mechanism 30 during the stowing operation of the above seat S will be described in accordance with FIGS. 9A to 9C.

Figure 9A:
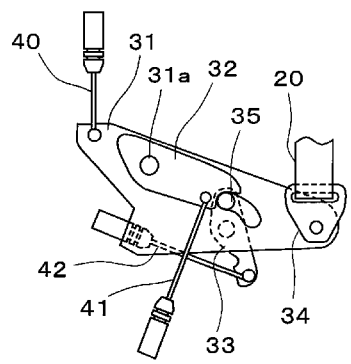
FIGS. 9A-C are action illustrative side views of the link mechanism during the stowing operation of the stowable vehicle seat according to the first embodiment of the present invention.

FIG. 9A shows a state of the link mechanism 30 in the installed state of the seat S (refer to FIG. 8A), which is a stage before the passenger operates the strap 20. The state of the link mechanism 30 at this time serves as the original position.

Figure 9B:
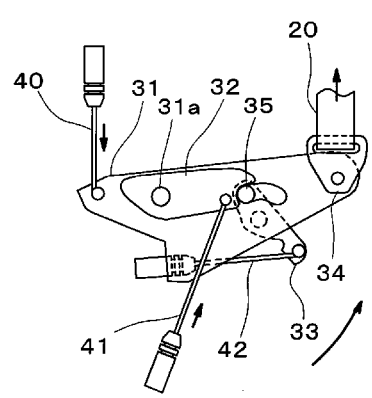

FIG. 9B shows a state of the link mechanism 30 during releasing the lock of the reclining mechanism 27 (FIG. 8B), which is a stage that the strap 20 is slightly pulled rearward. By the operation of the strap 20, the first link member 31 is rotated in the direction pulled by the strap 20. Therefore, the reclining release wire 40 is pulled in accordance with the rotation, so that the lock of the reclining mechanism 27 is released. At this time, since the seat back 12 is in the standing up state with respect to the seat cushion 11, the cancel wire 42 is not pulled, so that the second link member 32 is rotated together with the first link member 31 to also pull the leg portion release wire 41. However, the lock of the locking claws 43, 43 for connecting the front-side leg portion 14 and the vehicle body floor 4 side is set not to be released by the pulled amount in this state, so that the lock of the leg portion is maintained.

Figure 9C:
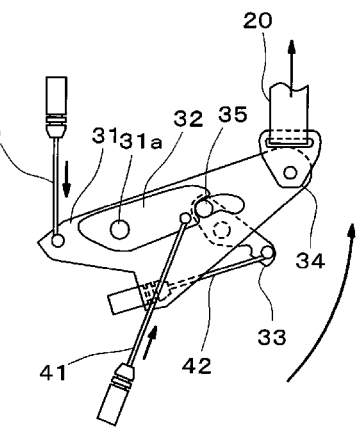

FIG. 9C shows a state of the link mechanism 30 when the lock between the reclining mechanism 27 and the locking claws 43, 43 of the front-side leg portion 14 is released (FIGS. 8C and 8D), which is a state in which the strap 20 is further pulled. Since the strap 20 is more strongly pulled than the state in FIG. 9B (FIG. 8B), the first link member 31 is largely rotated. The second link member 32 is rotated together with the first link member 31, so that the reclining release wire 40 and the leg portion release wire 41 are further pulled. At this time, the lock of the leg portion is released.

When the operation of the strap 20 is stopped after stowing the seat S, the link mechanism 30 is returned to the state of FIG. 9A by the reclining release wire 40 and the urging springs attached to the first link member 31 and the second link member 32. However, since the seat is stowed in a state in which the seat back 12 is folded down with respect to the seat cushion 11 (FIG. 8F), the cancel wire 42 is pulled, so that the third link member 33 is maintained while being rotated.

Next, the restoring operation of the seat S will be described in accordance with FIGS. 10A to 10E.

Figure 10A:
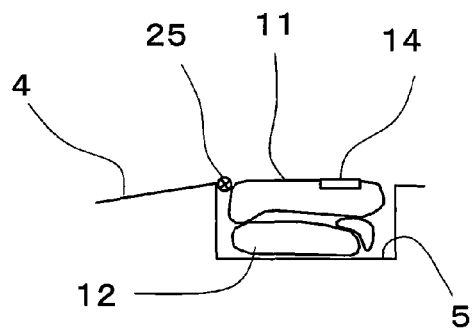
FIGS. 10A-E are illustrative side views showing the operation order during a restoring operation of the stowable vehicle seat according to the first embodiment of the present invention.

FIG. 10A shows a state in which the seat S is stowed. By pulling out a grip (not shown) provided on the back surface side of the seat cushion 11, the seat S is rotated in a restoring rotation direction.

Figure 10B:
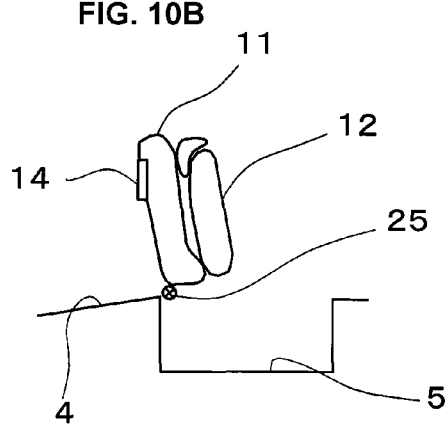

FIG. 10B shows a state of the restoring rotation of the seat S. Since the seat is urged in the restoring rotation direction by the coil spring 48 attached to the seat support portion 25, the operation load is reduced. In accordance with the forward rotation of the seat S, the front-side leg portion 14 is rotated by its own weight and developed downward.

Figure 10C:
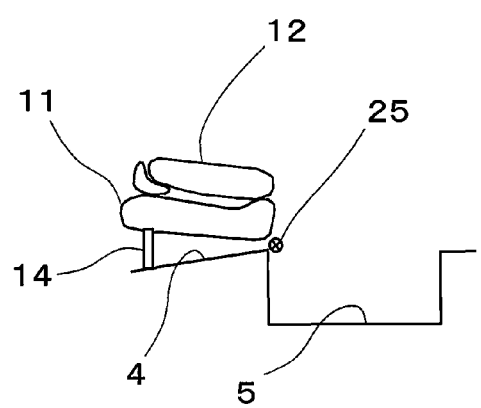

FIG. 10C shows a state in which the locking claws 43, 43 of the front-side leg portion 14 of the seat S are locked on the vehicle body floor 4 side. The locking claws 43, 43 are locked to the leg portion striker 44 on the vehicle body floor 4 side by pressing of the its own weight of the seat S. At this time, the seat back 12 is folded down with respect to the seat cushion 11.

Figure 10D:
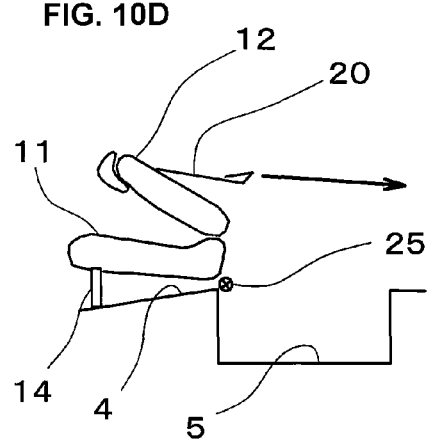

FIG. 10D shows an operation of pulling the strap 20 rearward from the state that the locking claws 43, 43 of the front-side leg portion 14 of the seat S are locked on the vehicle body floor 4 side. At this time, since the locked state of the locking claws 43, 43 is maintained, only the seat back 12 can stand up with respect to the seat cushion 11.

Figure 10E:
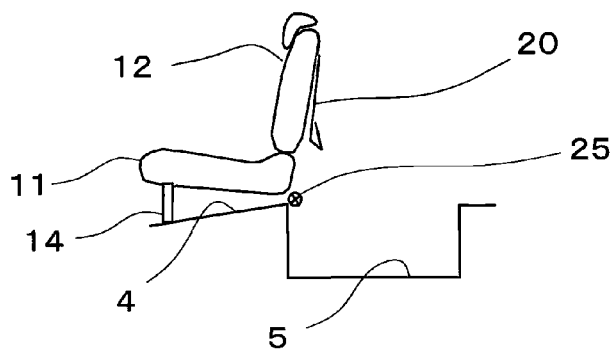

FIG. 10E shows a state in which the restoring operation of the seat S is completed.

That is, after forward rotation of the seat S in the stowed state in which the seat back 12 is folded down, the passenger can restore the seat S only by the operation of pulling the strap 20 rearward.

The action of the link mechanism 30 during restoring operation of the above seat S will be described in accordance with FIGS. 11A and 11B.

Figure 11A:
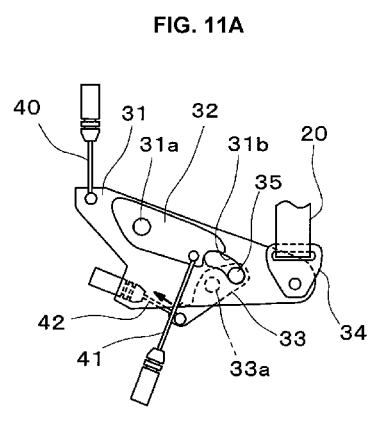
FIGS. 11A-C are action illustrative side views of the link mechanism during the restoring operation of the stowable vehicle seat according to the first embodiment of the present invention.

FIG. 11A shows a state of the link mechanism 30 from the stowed state of the seat S (FIG. 10A) to the stage that the seat S is rotated and the locking claws 43, 43 are locked to the vehicle body floor 4 side (FIG. 10C). The figure shows a stage before the strap 20 is operated by the passenger, and since the seat back 12 is folded down, the cancel wire 42 is pulled, so that the third link member 33 is maintained while being rotated.

Figure 11B:
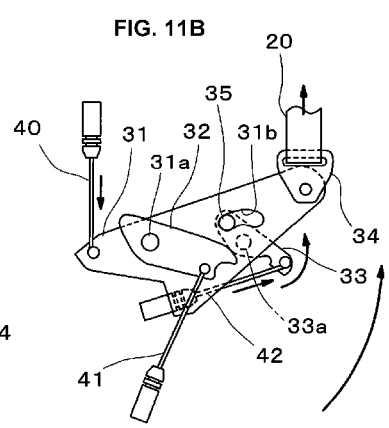

FIG. 11B shows a stage that the strap 20 is slightly pulled rearward in order to raise the seat back 12 (FIG. 10D). By the operation of the strap 20, the first link member 31 is rotated. In accordance with the rotation of the first link member 31, the reclining release wire 40 is pulled and the lock of the reclining mechanism 27 is released, so that the seat back 12 is rotatable rearward. At this time, the locking projection 35 is moved together with the third link member 33. Therefore, even when the first link member 31 is rotated, the second link member 32 cannot be locked and rotated. In accordance with raising of the seat back 12, the rotation amount of the third link member 33 is reduced. However, since the third link member is rotated exceeding a rotation range in which the locking projection 35 is abutted with the second link member 32, the locking recess portion 32b of the second link member 32 is maintained not to be locked to the first link member 31. Thus, the lock of the locking claws 43, 43 for connecting the front-side leg portion 14 and the vehicle body floor 4 side is maintained not to be released. Only by the operation of pulling the strap 20 is the seat back 12 raisable with respect to the seat cushion 11.

Figure 11C:
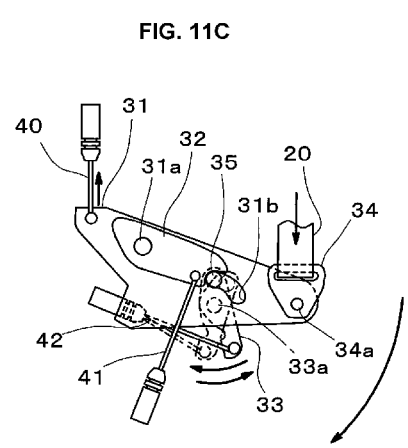

FIG. 11C shows a state in which the restoring operation of the seat S is completed (FIG. 10E). When the rearward pulling operation of the strap 20 is stopped, a position of the first link member 31 is returned to the original position by urging from the reclining release wire 40 and the leg portion release wire 41. At this time, since the seat back 12 is made to raise with respect to the seat cushion 11, the third link member 33 is not pulled by the cancel wire 42. Thus, the third link member 33 is rotated by a slight stress, the second link member 32 is also returned to the original position again to be locked to the first link member 31, and the link members of the link mechanism 30 are restored to states of the original positions (refer to FIG. 9A).

Now, a configuration of the erroneous operation preventing device 50 and an action during the operation will be described based on FIGS. 12A to 15C.

Firstly, the configuration of the erroneous operation preventing device 50 will be described based on FIGS. 12A and 12B. FIG. 12A is a schematic front view of the erroneous operation preventing device 50, and FIG. 12B is a schematic sectional view of the erroneous operation preventing device 50 by the line I-I.

The erroneous operation preventing device 50 is a device for regulating transmission of the operation force from the strap 20 to the link mechanism 30 in a case where the strap 20 is operated by an erroneous operation. The erroneous operation preventing device is attached to the center frame 22b and the back plate 28 as described above.

The erroneous operation preventing device 50 has a stopper bracket 51 fixed to the center frame 22b, a pair of substantially rectangular brackets 52, 52 arranged to raise with respect to the stopper bracket 51, the strap outlet portion 20a serving as an opening portion formed between the brackets 52, 52, a fourth connecting member 55 to be brought into sliding contact with the strap 20, a fifth connecting member 58 attached to a side surface portion of the fourth connecting member 55, a first connecting member 62 that is abuttable with the fifth connecting member 58, a second connecting member 65 connected to the first connecting member 62, and the strap connecting member 34 fixed to the one end portion side of the strap 20. All the above members are made of steel or resin members.

A connecting mechanism is formed by the fourth connecting member 55, the fifth connecting member 58, the first connecting member 62, the second connecting member 65, and the strap connecting member 34.

The stopper bracket 51 is a member fixed to an upper part of the center frame 22b by fixing members such as screws and rivets or welding, and the strap outlet portion 20a for guiding the strap 20 outward from the back side of the seat S is formed. The brackets 52, 52 are formed at both side positions of the strap outlet portion 20a to raise with respect to the stopper bracket 51.

A stopper locking portion 53 that is abuttable with a regulating member 56 provided in the fourth connecting member 55 described below is attached to the stopper bracket 51. The regulating member 56 corresponds to a first regulating member of various embodiments of the present invention, and the stopper locking portion 53 corresponds to a second regulating member of various embodiments of the present invention.

The brackets 52, 52 are members molded to raise with respect to the stopper bracket 51 as described above. The brackets are attached by welding or the fixing members such as the screws, and may additionally be formed by bending a part of the stopper bracket 51 or molded integrally by resin molding. Bearing groves 52a, 52a that support shaft portions 55a, 55a on both end portions dies of the fourth connecting member 55 are formed in center parts of the brackets 52, 52.

The fourth connecting member 55 is a substantially cubic member, and a part to be brought into sliding contact with the strap 20 is formed to be smooth. The fourth connecting member is oscillatably supported on the brackets 52, 52 by the shaft portions 55a, 55a. The strap 20 having the one end side locked to the link mechanism 30 side (strap connecting member 34) is brought into sliding contact with the fourth connecting member 55, and bent and guided into the strap outlet portion 20a. The fourth connecting member 55 is oscillated in accordance with movement of the strap 20 relative to the shaft portions 55a, 55a. The shaft portions 55a, 55a of the fourth connecting member 55 are formed on both side surfaces at positions on the rather front side relative to the seat back frame 22.

The fifth connecting member 58 is fixed to one of the side surfaces of the fourth connecting member 55. The substantially cylindrical regulating member 56 is provided on the side surface on the opposite side of the side surface to which the fifth connecting member 58 is fixed.

The regulating member 56 is a member abuttable with the above stopper locking portion 53 when the fourth connecting member 55 is oscillated to a predetermined position for regulating the oscillation of the fourth connecting member 55.

Although the regulating member 56 is abutted with the stopper locking portion 53 in the present embodiment, an opening portion (not shown) into which the regulating member 56 is insertable may be formed in the bracket 52, and a shape of the opening portion may be adjusted to regulate movement of the regulating member 56. For example, the opening part is formed into a long hole shape, so that upper and lower limits in the movement of the regulating member 56 are settable by a length of the long hole. In this case, an edge portion in one end portion of the long hole functions as the second regulating member.

Further, attachment positions of the regulating member 56 and the stopper locking portion 53 are not limited to the above positions. For example, when a member corresponding to the stopper locking portion 53 is provided on the back plate 28 at a position where the member is abuttable with a side surface of the first connecting member 62, and the member is abutted with the first connecting member 62 by a predetermined oscillation amount, the same effects as the above embodiment is obtained. In this case, the side surface of the first connecting member 62 corresponds to the regulating member 56.

The fifth connecting member 58 is a member having an L-shaped fixed to the side surface side of the fourth connecting member 55, and constitutes a movable member integrally with the fourth connecting member 55. A fixing position of the fifth connecting member 58 to the fourth connecting member 55 is on the slant position in a back surface direction relative to the seat back frame 22. Therefore, the fifth connecting member 58 is moved in the vertical direction in accordance with the oscillation of the fourth connecting member 55. A pressing portion 59 serving as a lower part of the fifth connecting member 58 is arranged to be abutted with a pressure receiving portion 63 of the first connecting member 62.

Although the fifth connecting member 58 is fixed to the fourth connecting member 55 in the present embodiment, the fifth connecting member may be connected to the fourth connecting member 55 through an oscillation shaft. In this case, preferably, a guide member is attached to the stopper bracket 51 to direct the fifth connecting member 58 in the predetermined direction all the time, or an urging spring is attached between the oscillation shaft and the fifth connecting member 58, so that the guide member or the urging spring is abutted with the pressing portion 59 by a fixed angle all the time.

The first connecting member 62 is a substantially triangular member oscillatably supported on the center frame 22b or the back plate 28 by a shaft portion 62a. The shaft portion 62a, the pressure receiving portion 63, and a first connecting portion 64 are respectively formed in tip portion sides of the first connecting member 62. The shaft portion 62a corresponds to a first movable shaft of various embodiments of the present invention.

The pressure receiving portion 63 is a substantially rectangular portion formed in a raising direction of the first connecting member 62 to project, and abuttably arranged with the pressing portion 59 of the fifth connecting member 58.

An urging spring 68 having one end portion side locked to the center frame side, and the other end portion side locked to one the first connecting member 62 side is attached to the shaft portion 62a. By the urging spring 68, the first connecting member 62 is urged in the direction where the first connecting member is abutted with the fifth connecting member 58 all the time.

The second connecting member 65 is a substantially rectangular member having one end portion side pivotally supported on the first connecting member 62 through the first connecting portion 64, and the other end portion side pivotally supported on the strap connecting member 34 through a second connecting portion 66.

The strap connecting member 34 corresponds to a third connecting member serving as a member for locking the one end portion of the strap 20. The strap connecting member is pivotally supported on the second connecting member 65 by the second connecting portion 66 and on the first link member 31 (refer to FIG. 5).

By the urging spring 68, the first connecting member 62 is urged in the direction where the first connecting member is abutted with the fifth connecting member 58 all the time. Thus, in a state in which the strap 20 is not operated, the pressure receiving portion 63 presses the pressing portion 59 upward, and the regulating member 56 provided in the fourth connecting member 55 is abutted with the stopper locking portion 53, so that the oscillation of the fourth connecting member 55 and the first connecting member 62 is regulated. Therefore, abnormal noise and backlash at the time of non-operation are prevented.

A resin outlet frame (not shown) is attached to the strap outlet portion 20a to prevent the strap 20 from being brought into contact with the strap outlet portion 20a and damaged.

Although the erroneous operation preventing device 50 in the present operation preventing device may be formed on the back surface side.

A relationship between constituent members of the erroneous operation preventing device 50 and the action will be described based on FIGS. 13A to 14B.

Figure 13A:
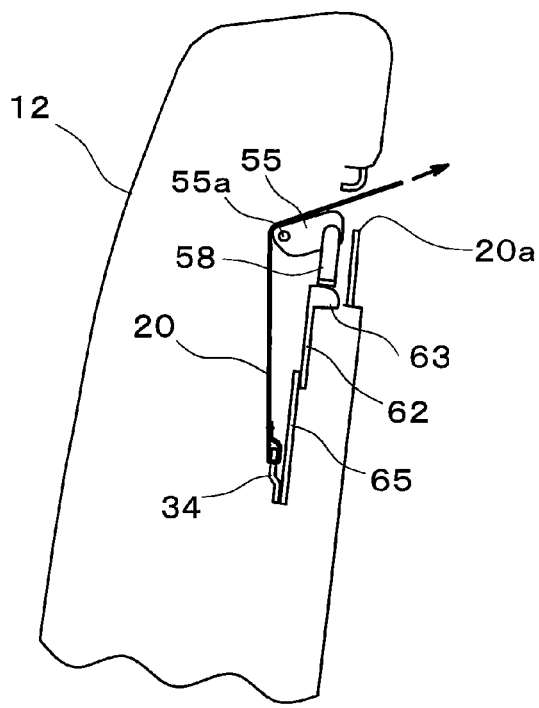
FIGS. 13A and B are action illustrative sectional views of the erroneous operation preventing device according to the first embodiment of the present invention.
Figure 14A:
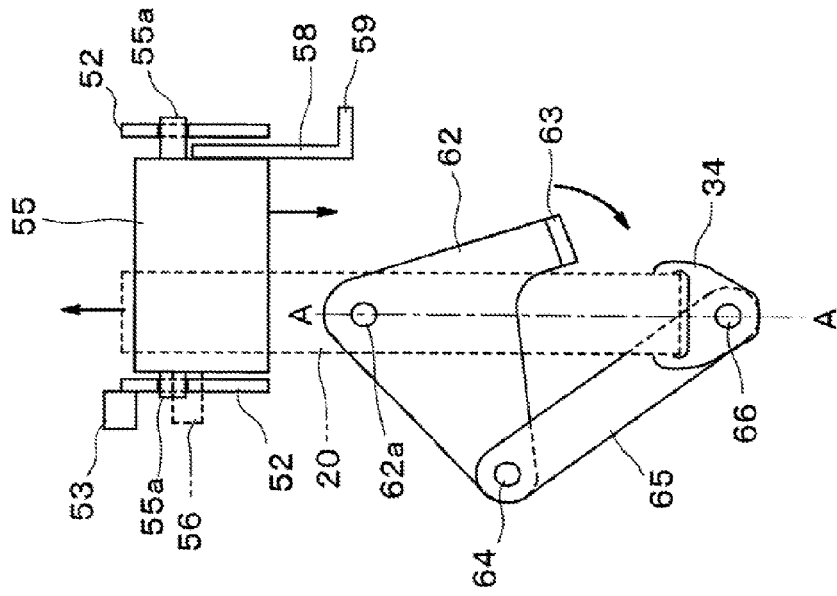
FIGS. 14A and B are action illustrative front views of the erroneous operation preventing device according to the first embodiment of the present invention.

FIGS. 13A and 14A show a state of the erroneous operation preventing device 50 at the time of the erroneous operation of the strap 20. That is, the figures show a case where the strap 20 extended on the outer side of the back surface of the seat back 12 is pulled upward relative to the seat back 12.

In this case, although the strap 20 is brought into sliding contact with the side of the shaft portions 52a, 52a of the fourth connecting member 55 (surface side), the strap is not brought into sliding contact with an upper surface on the side to which the fifth connecting member 58 is attached (back surface side). Therefore, a load of pressing downward on the back surface side of the fourth connecting member 55 is small, so that the fourth connecting member 55 cannot be oscillated. The pressing portion 59 of the fifth connecting member 58 does not press downward on the pressure receiving portion 63 of the first connecting member 62, so that the first connecting member 62 is maintained to not be oscillated.

At this time, the first connecting portion 64 is positioned on the pressure receiving portion 63 side relative to a straight line (A-A) connecting the shaft portion 62a and the second connecting portion 66. Thus, when the second connecting portion 66 is pulled upward by the pulling operation of the strap 20, the load is imposed on the third link member 64 in the direction where the pressure receiving portion 63 is pressed upward (urging direction of the urging spring 68). However, as described above, since the movement of the fourth connecting member 55 and the fifth connecting member 58 is regulated by the regulating member 56 and the stopper locking portion 53, the first connecting member 62 cannot be oscillated in the urging direction of the urging spring 68.

That is, even when the upward pulling operation of the strap 20 is performed relative to the seat back 12, the third link member 62 is not oscillated. Therefore, the upward movement of the strap 20 is restricted, so that the operation force from the strap 20 cannot be transmitted to the link mechanism 30 side.

Figure 13B:
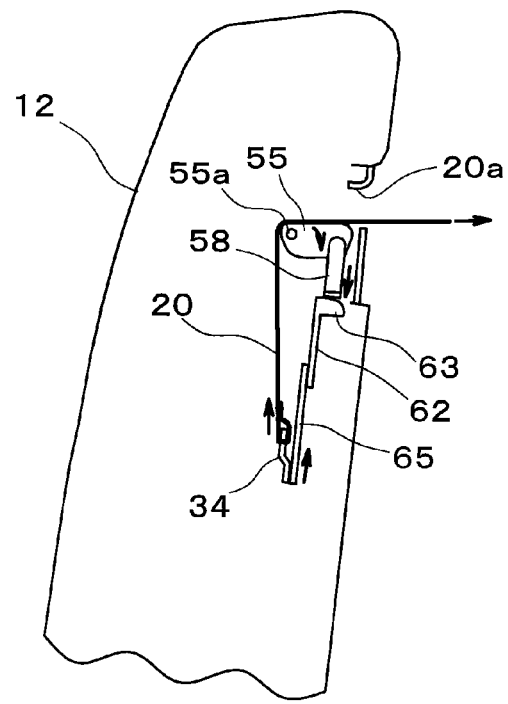
Figure 14B:
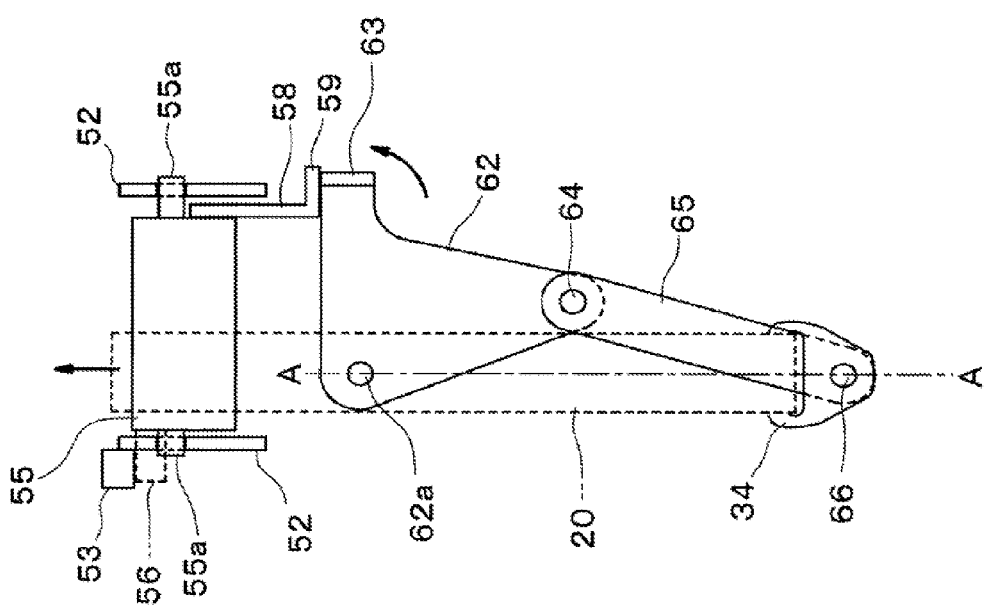

FIGS. 13B and 14B show a state of the erroneous operation preventing device 50 during a normal operation of the strap 20. That is, the figures show a case where the strap 20 is pulled rearward relative to the seat back 12.

In this case, the strap 20 is also brought into sliding contact with an upper part on the back surface side of the fourth connecting member 55. Therefore, the upper part on the back surface side of the fourth connecting member 55 is pressed downward that permits the fourth connecting member 55 to be oscillated. In accordance with the oscillation of the fourth connecting member 55, the pressing portion 59 of the fifth connecting member 58 presses downward the pressure receiving portion 63 of the first connecting member 62. The first connecting member 62 is oscillated relative to the shaft portion 62a.

By the oscillation of this first connecting member 62, the first connecting portion 64 is moved to the opposite side of the pressure receiving portion 63, and arranged at a position beyond the straight line (A-A) connecting the shaft portion 62a and the second connecting portion 66.

Thus, when the second connecting portion 66 is pulled upward by the pulling operation of the strap 20, the first connecting member 62 is oscillated in the direction where the pressure receiving portion 63 is moved downward (in the opposite direction to the urging direction of the urging spring 68). Since the oscillation of the first connecting member 62 in the opposite direction to the urging direction of the urging spring 68 is not regulated, the first connecting member 62 is largely oscillated, and accordingly the second connecting portion 66 is moved upward.

That is, when the rearward pulling operation of the strap 20 is performed relative to the seat back 12, the movement of the strap 20 is not restricted, so that the operation force from the strap 20 can be transmitted to the link mechanism 30 side.

The first connecting member 62 oscillated by the pulling operation of the strap 20 is restored to the initial position by urging force of the urging spring 68 when the pulling operation is stopped.

Angular width (release angular width) by which the pulling operation of the strap 20 is not regulated by the erroneous operation preventing device 50 is adjustable by changing the positional relationship between the constituent members such as arrangement of the shaft portions 55a, 55a of the fourth connecting member 55 and the shaft portion 62a, or an oscillation amount of the fifth connecting member 58.

The release angular width is preferably about 20° on the upper and lower sides relative to the vehicle body floor 4 surface in the seat S in the installed state.

Figure 15A:
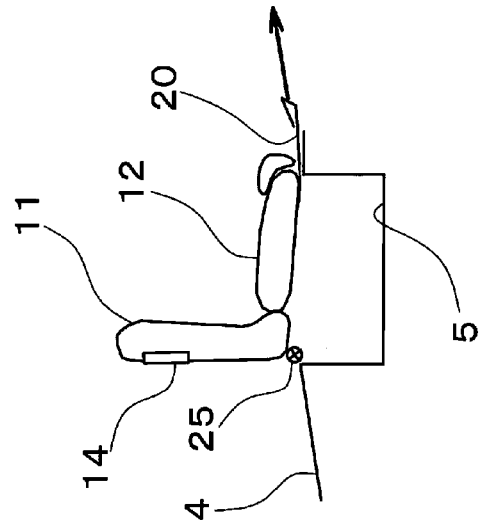
FIGS. 15A-C are illustrative side views of effective seat arrangements with which the erroneous operation preventing device of the stowable vehicle seat according to the first embodiment of the present invention.
Figure 15B:
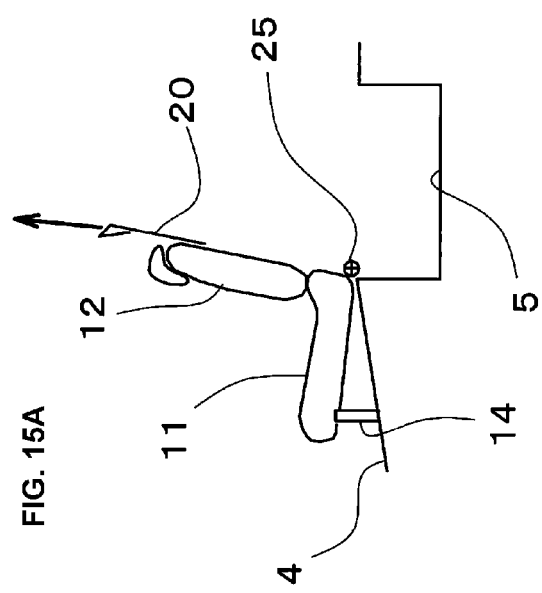
Figure 15C:
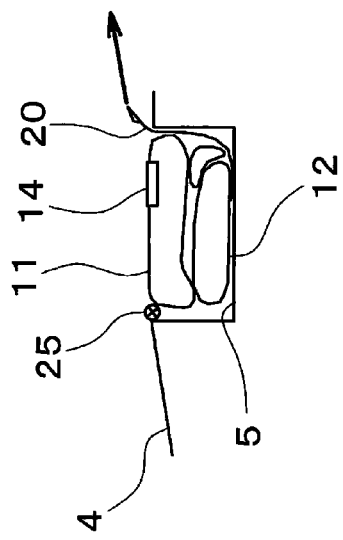

FIGS. 15A to 15C show the seat arrangements with which the erroneous operation is preventable by the erroneous operation preventing device 50 in the present embodiment.

FIG. 15A shows a case where the strap 20 is pulled upward in the seat S in the installed state. In this case, the pulling operation of the strap 20 is regulated by the erroneous operation preventing device 50, and both the lock of the reclining mechanism 27 and the lock of the front-side leg portion 14 are not released. This case assumes the erroneous operation due to an improper or unintentional operation by children or the like.

In this state, when the lock of the reclining mechanism 27 is released, the seat back 12 is rotatable forward or backward. Therefore, there is a fear that the seat back 12 is moved unpredictably to an operator of the strap 20 or other passengers. Any erroneous operation is preventable by the erroneous operation preventing device 50.

FIG. 15B shows a case where the strap 20 is pulled upward relative to the seat back 12 (rearward relative to the vehicle body direction) in a state in which the seat S is used as an open bench. In this case, the lock of the reclining mechanism 27 is also not released by the erroneous operation preventing device 50.

The open bench indicates a seat installed toward an open rear door side. In the present embodiment, the seat back 12 raising with respect to the seat cushion 11 is rotated rearward and maintained to be abutted with the vehicle body floor 4 (an edge portion of the stowage recess portion 5), whereas the seat back 12 is used as a seat cushion and the seat cushion 11 is used as a seat back, so that the seat S is directed toward the side of the rear door.

When the lock of the reclining mechanism 27 is released in this state, there is a fear that the seat S is rotated to a stowed position.

FIG. 15C shows a case where the upward pulling operation of the strap 20 is performed relative to the seat back 12 from the stowed state of the seat S. In this case, the lock of the reclining mechanism 27 is also not released by the erroneous operation preventing device 50.

Even when the lock of the reclining mechanism 27 is released in this state, there is no particular trouble in the seat S according to the present embodiment. However, in a seat provided with a mechanism for assisting the restoring operation from the stowage, there is sometimes a case where movement of the seat is unpredictable to the passenger.

For example, in a case where a spring for urging the seat back 12 in a direction where the seat back raises with respect to the seat cushion 11, or the like is provided as the assisting mechanism, when the lock of the reclining mechanism 27 is released, the seat back 12 is rotated in the direction where the seat back is raised by the urging element. Therefore, the seat cushion 11 is raised from the stowage recess portion 5.

Second Embodiment

FIGS. 16A and 16B show a second embodiment of the present invention serving as schematic illustrative views of an erroneous operation prevention device 70.

In the following embodiment, the same members, arrangement, and the like as the above embodiment will be given the same reference characters, and detailed description thereof will be omitted.

FIG. 16A is a schematic front view of the erroneous operation preventing device 70, and FIG. 16B is a schematic sectional view of the erroneous operation preventing device 70 by the line II-II.

The erroneous operation preventing device 70 shown in FIGS. 16A and 16B has a major difference from the erroneous operation preventing device 50 according to the first embodiment in shapes of a fourth connecting member 75 and bearing groove 72a, 72a.

The fourth connecting member 75 is formed into a columnar shape and rotatably supported on brackets 72, 72 by shaft portions 75a, 75a. A fifth connecting member 78 is rotatably attached to the shaft portion 75a.

Since the bearing grooves 72a, 72a formed in the brackets 72, 72 are elongated in the vertical direction, the bearing grooves support the shaft portions 75a, 75a movably in the vertical direction. That is, the bearing grooves 72a, 72a set limit values of a movement amount in the vertical direction of the shaft portions 75a, 75a, and also regulate movement in the front and rear direction.

Although the bearing grooves 72a, 72a are formed into long holes elongated in the vertical direction, the bearing grooves may be formed into a substantially U shape opened on the lower side.

Guides 72b, 72b for regulating the moving direction of the fifth connecting member 78 are formed in the brackets 72, 72 to regulate the fifth connecting member 78 movably only in the predetermined direction.

A strap guide member 76 is also attached to the brackets 72, 72. The strap guide member 76 is a member that is brought into sliding contact with the strap 20 to guide the strap 20 ranged from the strap connecting member 34 side into the strap outlet portion 20a.

With such a configuration, in a state in which the strap 20 is not operated, the pressure receiving portion 63 urges upward a pressing portion 79 of the fifth connecting member 78, and the shaft portions 75a, 75a of the fourth connecting member 75 are abutted with upper end portions of the bearing grooves 72a, 72 formed into long holes, so that upward movement of the fourth connecting member 75 and the fifth connecting member 78 is regulated.

That is, the shaft portions 75a, 75a and the upper part sides of the bearing grooves 72a, 72a in the present embodiment respectively correspond to the regulating member 56 and the stopper locking portion 53 in the first embodiment.

When the strap 20 is pulled rearward relative to the seat back 12, the strap 20 can press down the fourth connecting member 75. In accordance with the downward movement of the fourth connecting member 75, the fifth connecting member 78 is also moved downward to press downward the pressure receiving portion 63 of the first connecting member 62. When the strap 20 is pulled upward relative to the seat back 12, the strap 20 cannot press down the fourth connecting member 75 due to lack of sliding contact with the fourth connecting member.

Thus, the erroneous operation preventing device 70 can obtain the same operations and effects as the erroneous operation preventing device 50 shown in the first embodiment.

In the erroneous operation preventing device 70, the strap guide member 76 is not necessarily provided. In this case, by changing a relative position of a formation position in the vertical direction of the strap outlet portion 20a and a movement range of the fourth connecting member 75, the pulling direction of the strap 20 and the load of pressing down the fourth connecting member 75 are adjusted, so that the release angular width is settable.

The present invention is applicable, e.g., in a stowable vehicle seat in which the strap 20 and a lever are used together as stowage and restoration assembly. That is, by attaching the erroneous operation preventing device 50 or the erroneous operation preventing device 70 to the strap 20 in to the seat in which a leg portion lock is releasable by an operation of the lever, a reclining lock is released by the operation of the strap 20, and the seat is rotatable rearward, the same operations and effects as the seat S according to the first embodiment and the second embodiment are obtainable With the erroneous operation preventing devices 50, 70 according to various embodiments of the present invention, in a case where the strap 20 operated during the stowing and restoring operations of the seat S is pulled upward relative to the seat back 12, it is possible to prevent the transmission of the operation force to the link mechanism 30. Thus, it is possible to prevent the unpredictable movement of the seat S due to the erroneous operation such as an improper or unintentional operation or like by the children. It is also possible to prevent the unpredictable movement of the seat S due to the erroneous operation at the time of arranging the seat.

Further, by using the erroneous operation preventing devices 50, 70, reliability of a seat operation is enhanced. Therefore, it is possible to eliminate conventional treatments such as description in a manual and label display for giving a caution against the erroneous operation.

The configurations described above can be combined with each other unless departing from the gist of the present invention.

In the above embodiments, the seat on the third row divided on the left and right sides of the vehicle is described as a specific example. However, the present invention is not limited to this but the same configurations can be applied to an integrally formed long-bench-type seat or front passenger seat, or other rear seats, as a matter of course.

TABLE OF REFERENCE CHARACTERS

S Seat
F Seat frame
S1 Right seat
S2 Left seat
4 Vehicle body floor
5 Stowage recess portion
11 Seat cushion
12 Seat back
13 Headrest
14 Front-side leg portion
20 Strap
20a Strap outlet portion
21 Seat cushion frame
21a Back frame support portion
22 Seat back frame
22a Side frame
22b Center frame
23 Pillar support portion
24 Front-side leg portion frame
25 Seat support portion
27 Reclining mechanism
28 Back plate
28a Guiding hole portion
30 Link mechanism
31 First link member
31a First shaft portion
31b Long hole
32 Second link member
32b Locking recess portion
33 Third link member
33a Second shaft portion
34 Strap connecting member
34a, 40c, 41c, Locking portion 42c
35 Locking projection
40 Reclining release wire
40a Reclining release cable
40b, 41b, 42b End portion member
41 Leg portion release wire
41a Leg portion release cable
42 Cancel wire
42a Cancel cable
43 Locking claw
43a Locking claw rotating shaft
44 Leg portion striker
45, 68 Urging spring
48 Coil spring
49 Locking rib
50, 70 Erroneous operation preventing device
51 Stopper bracket
52, 72 Bracket
52a, 72a Bearing groove
72b Guide
53 Stopper locking portion
55a, 62a, 75a Shaft portion
55, 75 Fourth connecting member
56 Regulating member
58, 78 Fifth connecting member
59, 79 Pressing portion
62 First connecting member
63 Pressure receiving portion
64 Second connecting member
65 First connecting portion
66 Second connecting portion
76 Strap guide member

The invention claimed is:

1. An erroneous operation preventing device for, during stowing or folding operation of a stowable vehicle seat that is rotatable rearward and stowable by operating an operating element, locking movement of the operating element to regulate the stowing or folding operation, comprising:
   a connecting mechanism, comprising:
      a movable member that is abutted with the operating element to be moved;
      a first connecting member that is connectable to the movable member;
      a third connecting member locked to one end of the operating element;
      a second connecting member for connecting the first connecting member and the third connecting member; and
      a regulator for regulating the movable member,
   wherein
      the first connecting member is movably supported through a first movable shaft,
      the first connecting member and the second connecting member are movably connected to each other through a first connecting portion,
      the second connecting member and the third connecting member are movably connected to each other through a second connecting portion, and
      the first connecting portion is movable to cross a straight line connecting the first movable shaft and the second connecting portion.

2. The erroneous operation preventing device according to claim 1, wherein:

the regulator has a first regulating member provided on the movable member, and a second regulating member provided on a seat back side, the second regulating member being abuttable with the first regulating member.

3. The erroneous operation preventing device according to claim 2, wherein:
the first connecting member is urged in the direction where the first regulating member is abutted with the second regulating member all the time.

4. The erroneous operation preventing device according to claim 1, wherein:
the first connecting member and the second connecting member are arranged movably in a direction crossing the moving direction of the movable member.

5. The erroneous operation preventing device according to claim 1, wherein:
the movable member has a fourth connecting member slidably contactable with the operating element, and a fifth connecting member contactable to the first connecting member, and
the fifth connecting member is connected to the fourth connecting member.

6. The erroneous operation preventing device according to claim 5, wherein:
the fifth connecting member is supported at a position distant from a movable shaft of the fourth connecting member.

7. The erroneous operation preventing device according to claim 5, wherein:
the fifth connecting member is supported coaxially to a movable shaft of the fourth connecting member.

8. A stowable vehicle seat, having an erroneous operation preventing device for, during stowing or folding operation of a stowable vehicle seat that is rotatable rearward and stowable by operating an operating element, locking movement of the operating element to regulate the stowing or folding operation, the erroneous operation preventing device comprising:
a connecting mechanism, comprising:
a movable member that is abutted with the operating element to be moved;
a first connecting member that is connectable to the movable member;
a third connecting member locked to one end portion side of the operating element;
a second connecting member for connecting the first connecting member and the third connecting member; and
a regulator for regulating the movable member, wherein
the first connecting member is movably supported through a first movable shaft,
the first connecting member and the second connecting member are movably connected to each other through a first connecting portion,
the second connecting member and the third connecting member are movably connected to each other through a second connecting portion, and
the first connecting portion is movable to cross a straight line connecting the first movable shaft and the second connecting portion.

9. The stowable vehicle seat according to claim 8, wherein the regulator comprises a first regulating member provided on the movable member and a second regulating member provided on a seat back side, the second regulating member being abuttable with the first regulating member.

10. An erroneous operation preventing device for, during stowing or folding operation of a stowable vehicle seat that is rotatable rearward and stowable by operating an operating element, locking movement of the operating element to regulate the stowing or folding operation, comprising:
a connecting mechanism, comprising:
a movable member that is abutted with the operating element to be moved;
a first connecting member that is connectable to the movable member;
a third connecting member locked to one end of the operating element;
a second connecting member for connecting the first connecting member and the third connecting member; and
a regulator for regulating the first connecting member, wherein
the first connecting member is movably supported through a first movable shaft,
the first connecting member and the second connecting member are movably connected to each other through a first connecting portion,
the second connecting member and the third connecting member are movably connected to each other through a second connecting portion, and
the first connecting portion is movable to cross a straight line connecting the first movable shaft and the second connecting portion.

11. The erroneous operation preventing device according to claim 10, wherein the regulator comprises a first regulating member provided on the first connecting member and a second regulating member provided on a seat back side, the second regulating member being abuttable with the first regulating member.

12. A stowable vehicle seat, having an erroneous operation preventing device for, during stowing or folding operation of a stowable vehicle seat that is rotatable rearward and stowable by operating an operating element, locking movement of the operating element to regulate the stowing or folding operation, the erroneous operation preventing device comprising:
a connecting mechanism, comprising:
a movable member that is abutted with the operating element to be moved;
a first connecting member that is connectable to the movable member;
a third connecting member locked to one end portion side of the operating element;
a second connecting member for connecting the first connecting member and the third connecting member; and
a regulator for regulating the first connecting member; wherein
the first connecting member is movably supported through a first movable shaft,
the first connecting member and the second connecting member are movably connected to each other through a first connecting portion,
the second connecting member and the third connecting member are movably connected to each other through a second connecting portion, and
the first connecting portion is movable to cross a straight line connecting the first movable shaft and the second connecting portion.

13. The stowable vehicle seat according to claim 12, wherein:
the regulator has a first regulating member provided on the first connecting member, and a second regulating member provided on a seat back side, the second regulating member being abuttable with the first regulating member.

* * * * *